United States Patent [19]

Lee

[11] 4,209,371

[45] Jun. 24, 1980

[54] METHOD OF PROMOTING ESSENTIALLY COMPLETE VINYL POLYMERIZATION OF ULTRAVIOLET-CURABLE COMPOSITIONS

[75] Inventor: George A. Lee, Wayland, Mass.

[73] Assignee: The Dow Chemical Company, Midland, Mich.

[21] Appl. No.: 16,714

[22] Filed: Mar. 1, 1979

[51] Int. Cl.$^2$ .............................. C08F 2/46; C08F 4/00
[52] U.S. Cl. .......................... 204/159.22; 204/159.16; 204/159.19; 204/159.23; 204/159.24; 428/418; 428/462; 428/463; 427/54.1
[58] Field of Search ...................... 204/159.22, 159.23, 204/159.24, 159.19, 159.16; 427/54

[56] References Cited

U.S. PATENT DOCUMENTS

| | | | |
|---|---|---|---|
| 4,077,858 | 3/1978 | Costanza et al. | 204/159.23 |
| 4,088,948 | 5/1978 | Faust | 96/115 P |

*Primary Examiner*—Richard B. Turer

*Attorney, Agent, or Firm*—Gary R. Plotecher

[57] ABSTRACT

A method of essentially completely polymerizing ultraviolet-curable vinyl compositions containing monofunctional acrylate diluents, the method comprising:

(a) admixing with the composition at least about 1 weight percent, based upon the weight of the composition, of a polyester additive having a molecular weight not in excess of about 1,000, and (b) exposing the admixture of (a) to a sufficient amount of radiant energy to essentially completely polymerize the vinyl components of the composition.

For example, a composition consisting of the diacrylate of a bisphenol A and epichlorohydrin condensation adduct in a dicyclopentadiene acrylate diluent is vinyl polymerized in the presence of ethylene diacetate with electromagnetic radiation such that less than 2 percent unreacted dicyclopentadiene acrylate monomer is present in the resulting cured composition.

8 Claims, No Drawings

METHOD OF PROMOTING ESSENTIALLY COMPLETE VINYL POLYMERIZATION OF ULTRAVIOLET-CURABLE COMPOSITIONS

BACKGROUND OF THE INVENTION

1. Field of the Invention

This invention relates to the vinyl polymerization of ultraviolet (UV)-curable vinyl compositions. In one aspect, the invention relates to a class of additives useful in such a polymerization and in another aspect, the invention relates to the use of these additives to promote essentially complete vinyl polymerization of the composition.

2. Description of the Prior Art

Incomplete cure of UV-curable compositions is a problem long recognized in the art. Although this problem is manifest in many UV-curable compositions, the problem of incomplete cure with multifunctional acrylate materials is exemplary. Multifunctional acrylate diluents, such as 1,6-hexanediol diacrylate, trimethylol propane triacylate or pentaerythritol triacylate, are well-known to produce significant residual unsaturation in UV compositions. A similar but less well-recognized problem can also arise with sterically encumbered monofunctional acrylates such as dicyclopentadiene acrylate (DCPDA). Residual acrylate in cured coatings has several deleterious effects among which are changing film properties over time (films may become yellow and brittle) and objectionable odors. This latter effect is particularly true in the case of DCPDA. Although numerous approaches are known for essentially completing the cure of such UV-curable compositions, many are not effective with sterically encumbered monofunctional acrylates while others have undesirable limitations and/or features. For example, the use of various photoinitiators, comonomers, and drier metals, such as cobalt naphthenate, do not reduce the level of residual DCPDA below 5 or 6 weight percent of the cured composition. Others, such as a post-bake treatment, have limited utility. Post-baked treatment is generally limited to heat insensitive objects and requires an extra, energy-consuming process step.

U.S. Pat. No. 4,077,858 teaches the use of an aliphatic saturated ether as a promoter for essentially complete polymerization of residual unsaturation in multifunctional acrylate UV-curable compositions.

SUMMARY OF THE INVENTION

According to this invention, UV-curable vinyl compositions containing sterically encumbered monofunctional acrylate diluents are essentially completely polymerized by a method comprising:

(a) admixing with the composition at least about 1 weight percent, based upon the weight of the composition, of a polyester additive of the formula

   (I)

where each R can be the same or different and is

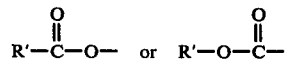

where R' is a $C_1$–$C_{10}$ aliphatic, $C_4$–$C_7$ alicyclic or an aryl radical, R' having no groups interferingly reactive with the UV-curing mechanism and M is a divalent aliphatic, alicyclic or aryl radical, M having no groups interferingly reactive with the UV-curing mechanism, with the provisoes that R' and M are not simultaneously aryl and the molecular weight of I is not in excess of about 1,000, and (b) exposing the admixture of (a) to a sufficient amount of energy to essentially completely polymerize the vinyl components of the composition.

This invention is particularly useful for reducing the residual amount of sterically encumbered monofunctional acrylates, such as DCPDA, to levels less than about 5 weight percent, and preferably less than about 3 weight percent, of the cured composition.

DETAILED DESCRIPTION OF THE INVENTION

Compounds of structure I have a molecular weight not in excess of about 1,000 and preferably not in excess of about 500. Compounds where each R is the same are preferred over compounds where each R is different and compounds where R' is a $C_1$–$C_{10}$ aliphatic radical are preferred to compounds where R' is a $C_4$–$C_7$ alicyclic or an aryl radical. Alkyl radicals are the preferred $C_1$–$C_{10}$ aliphatic radicals and these alkyl radicals, like the other aliphatic radicals, can be either linear or branched. The $C_1$–$C_5$ alkyl radicals are preferred to the other alkyl radicals.

The radicals of R' can bear one or more groups or substituents which are not interferingly reactive with the UV-curing mechanism, i.e., are essentially inert to the process reagents and products at the process conditions. These substitutents can be either pendant or integral to the R' radical, the latter illustrated by oxygen ether, sulfur, imino (NR') carbonyl and sulfone linkages. Pendant substituents include hydroxyl, halogen, acid, and ester radicals.

The divalent radicals of M include aliphatic, alicyclic or aryl radicals with the aliphatic radicals preferred to the alicyclic and aryl radicals. These radicals are divalent, each R joined to the M radical by one of the two valences. $C_2$–$C_{10}$ saturated aliphatic radicals are the preferred radicals with the $C_2$–$c_6$ saturated aliphatic radicals most preferred. Like the R' radicals, the divalent M radicals can bear one or more groups or substituents which are not interferingly reactive with the UV-curing mechanism. Preferably, such substituents are integral to the M radical with the ether, carbonyl, imino, sulfur and sulfone substituents preferred over other substituents.

Compounds of structure I can contain more than 2 ester functionalities. Such compounds have ester functionalities pendant from the divalent M radical. Exemplary of these multiester compounds are those derived from glycerol and pentaerythritol.

The following is a representative illustration of the additive of Structure I:

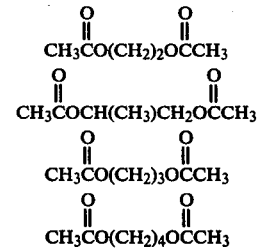

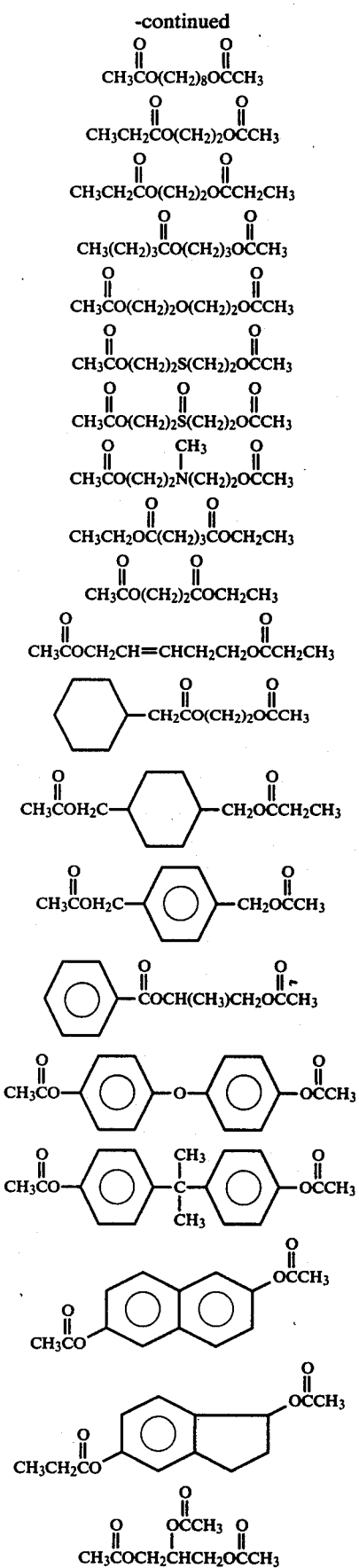

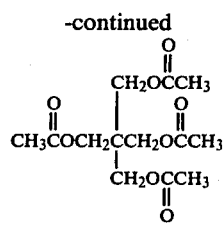

The UV-curable vinyl compositions of this invention contain from about 30 to about 95 percent, by weight, based upon the total curable composition, of an α,β-ethylenically unsaturated vinyl polymerizable compound containing at least 2 vinyl polymerizable groups er molecule. A wide variety of such materials can be here used and such materials are detailed at length in U.S. Pat. No. 4,077,858 here incorporated by reference. As disclosed in U.S. Pat. No. 4,077,858, compounds containing a single polymerizable ethylenically unsaturated group can also be used. In addition to those disclosed in U.S. Pat. No. 4,077,858, sterically encumbered monofunctional acrylates can also be used. "Sterically encumbered" means the acrylate functionality is pendant from either a ring structure (either aromatic or nonaromatic) or from a highly branched aliphatic radical. This invention is particularly useful for promoting essentially complete polymerization of vinyl compositions containing DCPDA as a diluent. Viscosity considerations are the principle limitation upon the relative concentrations of diluent and α,β-ethylenically unsaturated vinyl polymerizable compound employed in the UV-curable compositions of this invention, but the 30 to about 95 weight percent concentration of compound is typical.

The preferred manner of practicing this invention employs, in addition to the additives of structure I, a photoinitiator, preferably in combination with a photoinitiator synergist. The photoinitiator is useful for sensitizing the UV-curable compositions to UV light and the photoinitiator synergist is useful for enhancing the cure response of the UV-curable composition. The art is replete with both photoinitiators and photoinitiator synergists and those disclosed in U.S. Pat. No. 4,077,858 are exemplary. Acetophenone photoinitiators are the preferred photoinitiators and these are amply described in U.S. Pat. No. 3,715,293. Tertiary alkanolamines, such as methyl diethanolamine, are the preferred photoinitiator synergists. The photoinitiators and photoinitiator synergists are used in the known prior art manner and concentrations.

The additives of structure I are employed from a concentration of at least about 1 weight percent and preferably of at least about 5 weight percent. Practical considerations such as coating cure response and additive cost, restrict maximum amount of I that can be used, with about 20 percent and preferably about 15 percent as the total maximum weight.

The additives of structure I are used in the same manner as known additives, such as those of U.S. Pat. No. 4,077,858. Typically a mixture of the composition in combination with a photoinitiator and a photoinitiator synergist is prepared and applied to a substrate. The composition is then exposed to electromagnetic radiation having wavelengths of above about 2,000 Angstrom units up to preferably of about 5,000 Angstrom units. The source is typically located about 1 to 5 inches from the coating for a time sufficient to cause cross-linking of the composition and can range from about 0.1 seconds up to about 1 minute/linear foot. The light radiation will generally have a power of about 200 watts per linear foot. The light radiation can be ultraviolet light generated from any one of a number of different pressure mercury lamps.

The following are illustrative embodiments of this invention. Unless indicated to the contrary, all parts and percentages are by weight.

SPECIFIC EMBODIMENTS

Control A:

An UV-curable composition was prepared from a 50/50 mixture (1.91 g) of DCPDA as a diluent and a resin (prepared from the condensation of bisphenol A, epichlorohydrin and acrylic acid), diethoxyacetophenone (0.0697 g) and methyl diethanolamine (0.0422 g). This mixture was spread onto steel test panels with a No. 7 Meyer wound wire rod and was then cured by passing under a 200 watt/linear inch Hanovia mercury arc lamp on a conveyor belt moving at 100 feet/minute. After 6 passes the coating developed a hard, mar-free surface. The coating was then extracted with methylene chloride and a standard solution of 2-chloronaphthalene was added to the extracts. Analysis of the extracts by quantitative gas/liquid phase chromatography indicated that 5.5 percent of free, monomeric DCPDA was contained in the coating.

EXAMPLE 1

A composition similar to Control A was prepared with 1.7449 g of the 50/50 diluent/resin mixture, 0.0622 g of diethoxyacetophenone, 0.0447 g of methyl diethanolamine and 0.1593 g of 1,2-ethanediol, diacetate. After 6 passes under the mercury arc lamp, a hard, mar-free coating was obtained. Extraction of the coating revealed that 2.3 percent of unreacted DCPDA monomer was present in the coating. After 8 passes, 1.71 percent unreacted DCPDA monomer was found. No odor of residual DCPDA was detected after 15 minutes.

Control B and Examples 3-8:

An UV-curable composition was prepared from DCPDA (47.7 percent), a resin (47.7 percent, prepared from the condensation of bisphenol A, epichlorohydrin and acrylic acid), diethoxyacetophenone (2.58 percent) and methyl diethanolamine (2 percent). Various concentrations of the additives of structure I were then added to aliquot portions of the composition and the additive-modified compositions were then cured under the conditions of Control A. The rates of cure and the amounts of residual DCPDA in the cured coatings were subsequently determined, also by the method of Control A. The results are reported in the following table.

| Cure Response of UV-Curable Compositions Containing DCPDA* and Polyester Additives | | | |
|---|---|---|---|
| Con. & Ex. | Additive | Additive (Wt. %) | Passes to Cure at 100 ft/min | Unreacted DCPDA (Wt. %) |
| B | None | | 5 | 6.38 |
|   |   |   | 15 | 5.4 |
| 3 | 1,2-Ethane-diol, diacetate | 5 | 8 | 3.0 |
|   |   | 10 | 9/10 | 1.79 |
|   |   | 15 | 12 | 1.72 |
|   |   | 20 | 14/15 | 1.35 |
| 4 | 1,2-Propane-diol, diacetate | 5 | 7/8 | 3.1 |
|   |   | 10 | 11 | 1.99 |
| 5 | Ethanol:2,2'-oxybis-, diacetate | 10 | 16 | 1.70 |
| 6 | Ethanol:2,2'-thiobis-, diacetate | 5 | 10 | 2.25 |
|   |   | 10 | 17/18 | 0.75 |
| 7 | Ethane:2,2'-sulfinyl-bis-, diacetate | 10 | 9/10 | 2.30 |
| 8 | Pentanedione, ethyl ester | 5 | 11 | 2.35 |
|   |   | 10 | 17 | 1.71 |
|   |   | 15 | 22 | 1.67 |
|   |   | 20 | 28 | 1.17 |

*Contains 2.6 percent diethoxyacetophenone and 2.0 percent methyl diethanolamine.

The data of the above table demonstrate that the polyester additives of this invention promote essentially complete vinyl polymerization of the UV-curable composition. In each instance the additive reduced the amount of residual DCPDA diluent to less than 5 weight percent of the cured composition and frequently to less than 2 weight percent of the cured composition. More passes to cure were required for curing those compositions containing the greater amounts of additive because of the dilution effect the added additive has on the initial amount of photoinitiator.

Although this invention has been described in considerable detail by way of the above examples, this detail is for the purpose of illustration only and is not intended to be a limitation on the scope of this invention or the appended claims.

What is claimed is:

1. In a method of essentially completely polymerizing UV-curable vinyl compositions containing sterically encumbered monofunctional acrylate diluents, the improvement comprising:

(a) admixing with the composition at least about 1 weight percent, based upon the weight of the composition, of a polyester additive of the formula

R—M—R    (I)

where each R can be the same or different and is

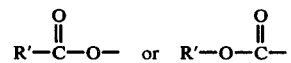

$$R'-\overset{O}{\underset{\|}{C}}-O- \quad \text{or} \quad R'-O-\overset{O}{\underset{\|}{C}}-$$

where R' is a $C_1$–$C_{10}$ aliphatic, $C_4$–$C_7$ alicyclic or an aryl radical, R' having no groups interferingly reactive with the UV-curing mechanism and M is a divalent aliphatic, alicyclic or aryl radical, M having no groups interferingly reactive with the UV-curing mechanism, with the provisoes that R' and M are not simultaneously aryl and the molecular weight of I is not in excess of about 1,000, and (b) exposing the admixture of (a) to a sufficient amount of "electromagnetic radiation having wavelengths of above about 2,000 Angstrom units" to essentially completely polymerize the vinyl components of the composition.

2. The method of claim 1 wherein the molecular weight of I is not in excess of about 500.

3. The method of claim 2 wherein R' is a $C_1$-$C_{10}$ alkyl radical.

4. The method of claim 3 wherein M is a $C_2$-$C_{10}$ saturated aliphatic radical.

5. The method of claim 4 wherein I is present in a concentration of at least about 5 weight percent.

6. The method of claim 5 wherein at least one of the sterically encumbered monofunctional acrylate diluents is dicyclopentadiene acrylate.

7. The method of claim 6 wherein the dicyclopentadiene acrylate is the principle sterically encumbered monofunctional acrylate diluent.

8. The method of claim 7 wherein I is 1,2-ethanediol, diacetate or 1,2-propanediol, diacetate.

* * * * *

UNITED STATES PATENT AND TRADEMARK OFFICE
CERTIFICATE OF CORRECTION

PATENT NO. : 4,209,371
DATED : June 24, 1980
INVENTOR(S) : George A. Lee

It is certified that error appears in the above-identified patent and that said Letters Patent are hereby corrected as shown below:

Column 1, line 22, delete "triacylate," and insert --triacrylate,--.

Column 1, line 41, delete "Post-baked" and insert --Post-bake--

Column 2, line 32, delete "substitutents" and insert --substituents--.

Column 2, line 43, delete "$C_2-C_6$" and insert --$C_2-C_6$--.

Column 4, line 16, delete "er" and insert --per--.

Signed and Sealed this

Fourth Day of November 1980

[SEAL]

Attest:

SIDNEY A. DIAMOND

Attesting Officer

Commissioner of Patents and Trademarks